United States Patent
Gomi

(10) Patent No.: US 6,196,365 B1
(45) Date of Patent: Mar. 6, 2001

(54) BRAKING HYDRAULIC PRESSURE CONTROL APPARATUS AND METHOD OF USE FOR VEHICLE

(75) Inventor: Genichi Gomi, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 09/294,310

(22) Filed: Apr. 20, 1999

(30) Foreign Application Priority Data

Jul. 1, 1998 (JP) .................................................. 10-185958

(51) Int. Cl.[7] ............................... B60T 8/48; B60T 17/00
(52) U.S. Cl. .................. 188/352; 303/113.2; 303/119.1; 303/116.1
(58) Field of Search ............................. 303/113.2, 119.1, 303/116.1, 116.2, 139, 140, 900, 901; 188/352; 141/98

(56) References Cited

U.S. PATENT DOCUMENTS

| | | | |
|---|---|---|---|
| 4,989,924 | * 2/1991 | Toda et al. | 303/119.1 |
| 5,026,127 | * 6/1991 | Arikawa | 303/116.1 |
| 5,156,448 | * 10/1992 | Kirstein | 303/113.2 |
| 5,169,214 | * 12/1992 | Holzman et al. | 303/113.2 |
| 5,205,623 | * 4/1993 | Holzmann et al. | 303/113.2 |
| 5,275,476 | * 1/1994 | Maisch | 303/113.2 |
| 5,549,366 | * 8/1996 | Toda et al. | 303/113.2 |
| 5,961,188 | * 10/1999 | Sawada | 303/116.1 |
| 6,056,370 | * 5/2000 | Okuya et al. | 303/116.2 |

FOREIGN PATENT DOCUMENTS

| | | |
|---|---|---|
| 4365660 | * 12/1992 | (JP) . |
| 5-65388 | 9/1993 | (JP) . |
| 0016267 | * 1/2000 | (JP) . |

* cited by examiner

Primary Examiner—Douglas C. Butler
(74) Attorney, Agent, or Firm—McGuireWoods LLP

(57) ABSTRACT

A braking hydraulic pressure control apparatus for a vehicle comprising switching valve capable of switching between communicating and shut-off states between a master cylinder and hydraulic passages, and between communicating and shut-off states between the master cylinder and open passages. A driving-wheel control valve is also provided for controlling hydraulic pressure in driving-wheel brakes, and pumps whose inlet ports are connected to respective reservoirs and whose discharge ports are connected to respective hydraulic passages. The open passages are connected to the inlet ports of the respective pumps to improve the ability to remove air from the hydraulic pressure system, and allow simpler air-removing equipment to be utilized. The switching valve comprise opened-type and closed-type electromagnetic valves. Opened-type electromagnetic valves are positioned between the master cylinder and the hydraulic passages. Closed-type electromagnetic valves are positioned between the master cylinder and the open passages. When air is removed by drawing a vacuum in the direction of the master cylinder before it is filled with brake fluid, the closed-type electromagnetic valves are excited and opened.

6 Claims, 2 Drawing Sheets

BRAKING HYDRAULIC PRESSURE CONTROL APPARATUS AND METHOD OF USE FOR VEHICLE

BACKGROUND OF THE INVENTION

1. Field of the Invention

The present invention generally relates to a braking hydraulic pressure control apparatus for a vehicle and, more particularly, to an apparatus which is capable of anti-lock brake control and traction control over driving-wheel brakes.

2. Background Description

A braking hydraulic pressure control apparatus of the sort mentioned above is discussed in Japanese Patent Publication No. Hei. 5-65388.

In such a braking hydraulic pressure control apparatus, a switching valve means is actuated during normal braking operation. During normal braking operations and in the anti-lock brake control mode, a hydraulic passage connected to the discharge port of a pump is connected to a master cylinder, and an open passage connected to an inlet port of the pump is shut off from the master cylinder. When driving-wheel traction control is carried out, the switching valve means is actuated so that the open passage is connected to the master cylinder and the hydraulic passage is shut off from the master cylinder.

Prior to filling the master cylinder with brake fluid, a vacuum is drawn from the master cylinder side in order to remove air from the system. A three-port, two-position electromagnetic switching valve capable of switching between the following two positions has been employed as a switching valve means in the prior art. In the first position, the master cylinder is connected to the hydraulic passage, but is shut off from the open passage. In the second position, the master cylinder is connected to the open passage, but is shut off from the hydraulic passage. Consequently, in order to draw a vacuum, the three-port, two-position electromagnetic switching valve needs to be switched in two stages. In other words, a first vacuum is drawn when the three-port, two-position electromagnetic switching valve is positioned so that the master cylinder is connected to the hydraulic passage, but shut off from the open passage. Air can then be removed from the hydraulic pressure system between the driving- wheel brake and the master cylinder, and between the discharge port of the pump and the master cylinder. The three-port, two-position electromagnetic switching valve is then switched so that the master cylinder is connected to the open passage, but shut off from the hydraulic passage. A second vacuum is drawn from the hydraulic pressure system among the inlet port of the pump, the reservoir and the master cylinder. Although air can be sufficiently removed from the described braking control apparatus, the equipment utilized to remove the air tends to be complex because the valve position of the three-port, two-position electromagnetic switching valve has to be moved when removing air.

SUMMARY OF THE INVENTION

It is therefore an object of the present invention to provide a braking hydraulic pressure control apparatus for a vehicle that provides traction control for the driving-wheels.

Another object of the present invention is to improve the way in which air is removed from the hydraulic pressure system.

Another object of the invention is to allow the use of simpler air-removing equipment during the air-removal process.

According to the invention, there is provided a braking hydraulic pressure control apparatus for a vehicle comprising a switching valve means capable of switching between communicating and shut-off states between a master cylinder and hydraulic passages, and between communicating and shut-off states between the master cylinder and open passages. A driving-wheel control valve means is provided for controlling hydraulic pressure in driving-wheel brakes by switching between communicating and shut-off states between the hydraulic passages and the respective driving-wheel brakes, between communicating and shut-off states between the driving-wheel brakes and reservoirs, and between communicating and shut-off states between pumps whose inlet ports are connected to the respective reservoirs and whose discharge ports are connected to the respective hydraulic passages. The open passages are connected to the inlet ports of the respective pumps. The switching valve means include opened-type electromagnetic valves positioned between the master cylinder and the hydraulic passages, and closed-type electromagnetic valves positioned between the master cylinder and the open passages, respectively.

When the work of removing air is done by drawing a vacuum in the direction of the master cylinder prior to the filling of brake fluid, the closed-type electromagnetic valves are excited and opened. A connection is therefore established between the front wheel brake and the master cylinder; between the discharge port of the pump and the master cylinder; and among the inlet port of the pump, the reservoir and the master cylinder. Therefore, removal of air can be made at a time by drawing a vacuum in the hydraulic pressure system related to the driving-wheel brake, thus improving the ability to remove air from the system. Moreover, the air-removing equipment can also be simplified because it is unnecessary to switch the operation of the switching valve means during the air-removing work.

The invention is also characterized by including a driven-wheel control valve means for controlling hydraulic pressure in driven-wheel brakes by switching between communicating and shut-off states between the master cylinder and the driven-wheel brakes, and between communicating and shut-off states between the driven-wheel brakes and the respective reservoirs. Having this control valve means also improves the ability to remove air from the system since air can be removed from the hydraulic pressure system related to the driven-wheel brake simultaneously when air is removed from the hydraulic pressure system related to the driving-wheel brake.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

A detailed description of a preferred embodiment of the present invention will now be described with reference to FIGS. 1 and 2 of the drawings.

Figure 1:
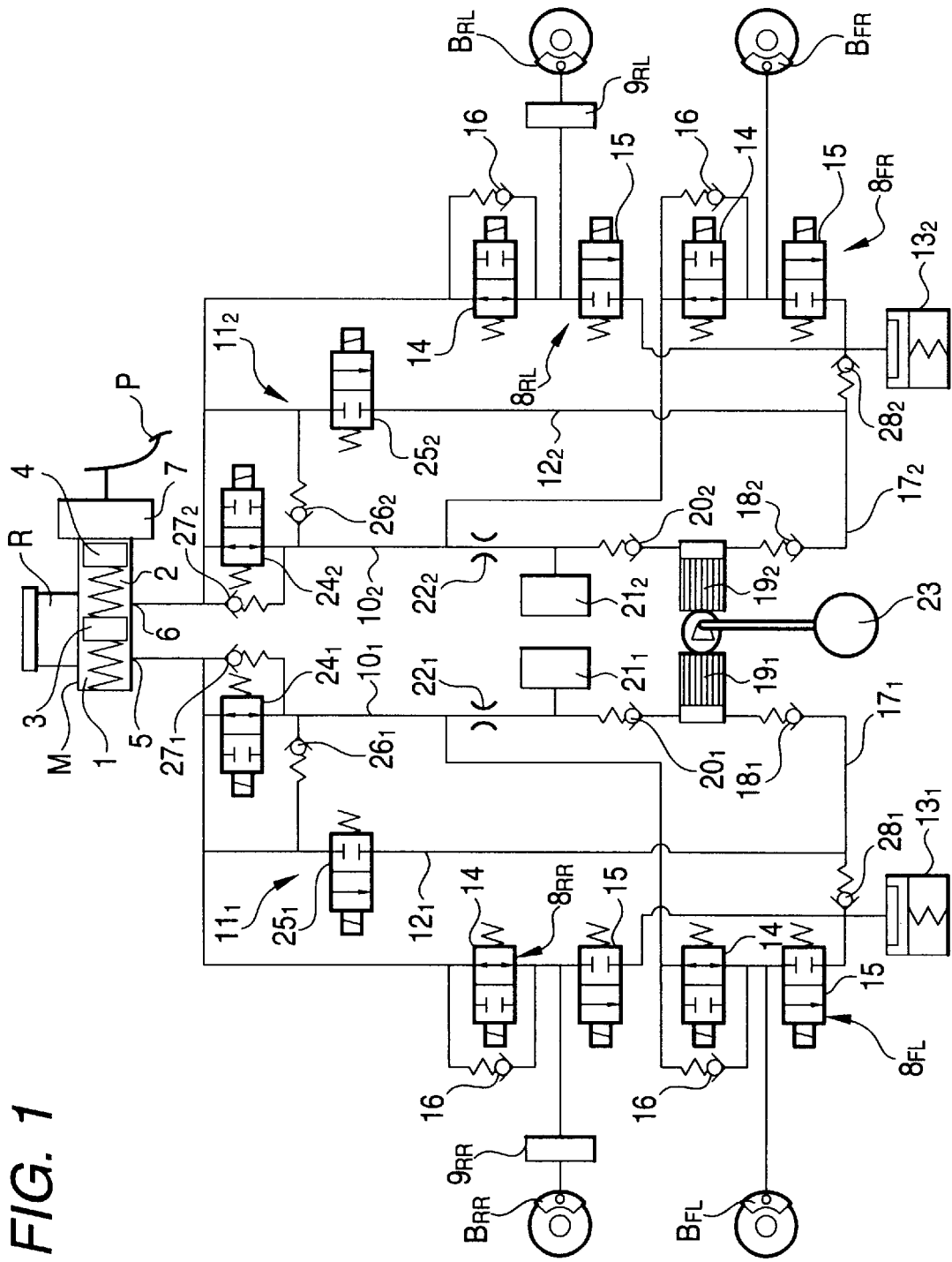
FIG. 1 is a block diagram illustrating an arrangement of a braking hydraulic pressure control apparatus according to a preferred embodiment of the invention.
Figure 2:
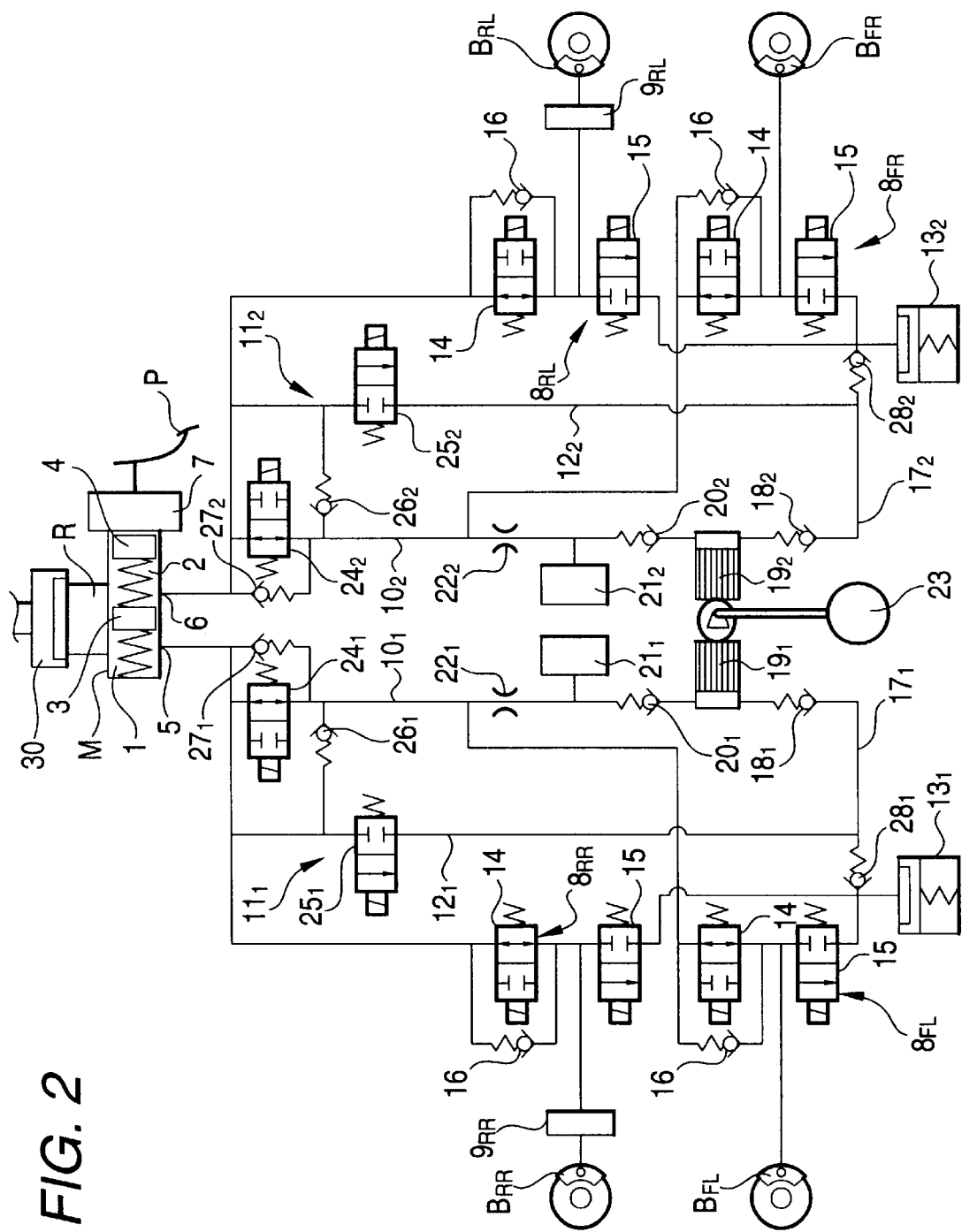
FIG. 2 is a block diagram illustrating the air-removing work condition of the braking hydraulic pressure control apparatus of FIG. 1.

FIGS. 1 and 2 show a preferred embodiment of the present invention. A tandem type master cylinder M comprises a reservoir R, a first piston 3 whose front end faces a first hydraulic chamber 1, a second piston 4 whose front end faces a second hydraulic chamber 2 formed between the first piston 3 and second piston 4, and a first output port 5 and a second output port 6 respectively connected to the first hydraulic chamber 1 and second hydraulic chamber 2. The force of stepping on brake pedal P is amplified by an amplifying means such as a negative pressure booster 7 before being transmitted to the second piston 4. As the hydraulic pressure increases in the second hydraulic chamber 2 as the second piston 4 advances, the first piston 3 also advances in proportion to the increase in pressure in hydraulic chamber 2, whereby the hydraulic pressure in the first hydraulic chamber 1 is increased.

The first output port 5 of the master cylinder M corresponds to a right rear wheel brake $B_{RR}$ as a driven-wheel brake and a left front wheel brake $B_{FL}$ as a driving-wheel brake. The output port 6 of the master cylinder M corresponds to a left rear wheel brake $B_{RL}$ as a driven-wheel brake and a right front wheel brake $B_{FR}$ as a driving-wheel brake. The braking hydraulic pressure from first output port 5 is controlled by a driven-wheel control valve means $8_{RR}$. The braking hydraulic pressure from the driven-wheel control valve means $8_{RR}$ is reduced by a proportional pressure reducing valve $9_{RR}$ and the reduced hydraulic pressure acts on the right rear wheel brake $B_{RR}$. Further, the braking hydraulic pressure from the first output port 6 is controlled by a driven-wheel control valve means $8_{RL}$. The braking hydraulic pressure from the driven-wheel control valve means $8_{RL}$ is reduced by a proportional pressure reducing valve $9_{RL}$. The reduced hydraulic pressure acts on the right rear wheel brake $B_{RL}$.

The output port 5 of the master cylinder M is connected to a first hydraulic passage $10_1$ corresponding to the left front wheel brake $B_{FL}$. The hydraulic pressure in the first hydraulic passage $10_1$, controlled by a driving-wheel control valve means $8_{FL}$, acts on the left front wheel brake $B_{FL}$. The output port 6 of the master cylinder M is connected to a second hydraulic passage $10_2$ corresponding to the right front wheel brake $B_{FR}$. The hydraulic pressure in the second hydraulic passage $10_2$, controlled by a driving-wheel control valve means $8_{FR}$, acts on the right front wheel brake $B_{FR}$. In addition to being connected to first hydraulic passage $10_1$, first output port 5 may also be connected to a first open passage $12_1$ via a first switching valve means $11_1$. In addition to being connected to second hydraulic passage $10_2$, second output port 6 may also be connected to a second open passage $12_2$ via a second switching valve means $11_2$.

The control valve means $8_{FL}$, $8_{FR}$, $8_{RL}$ and $8_{RR}$ are comprised of opened-type electromagnetic valves 14, closed-type electromagnetic valves 15, and one-way valves 16, respectively. In the driven-wheel control valve means $8_{RR}$ corresponding to the right rear wheel brake $B_{RR}$, an opened-type electromagnetic valve 14 is positioned between the first output port 5 of the master cylinder M and the proportional pressure reducing valve $9_{RR}$. A closed-type electromagnetic valve 15 is positioned between the proportional pressure reducing valve $9_{RR}$ and the first reservoir $13_1$. Finally, one-way valve 16 is connected in parallel with the opened-type electromagnetic valve 14. One-way valve 16 allows the circulation of brake fluid toward the first output port 5.

In the driving-wheel control valve means $8_{FL}$ corresponding to the left front wheel brake $B_{FL}$, an opened-type electromagnetic valve 14 is positioned between the first hydraulic passage $10_1$ and the left front wheel brake $B_{FL}$. A closed-type electromagnetic valve 15 is positioned between the front wheel brake $B_{FL}$ and the first reservoir $13_1$ for common use with the driven-wheel control valve means $8_{RR}$ and the left front wheel brake $B_{FL}$. Finally, one-way valve 16 is connected in parallel with opened-type electromagnetic valve 14. One-way valve 16 allows brake fluid to circulate towards the first hydraulic passage $10_1$.

In the driven-wheel control valve means $8_{RL}$ corresponding to the left rear wheel brake $B_{RL}$, an opened-type electromagnetic valve 14 is positioned between the second output port 6 of the master cylinder M and the proportional pressure reducing valve $9_{RL}$. A closed-type electromagnetic valve 15 is positioned between the proportional pressure reducing valve $9_{RL}$ and the second reservoir $13_2$. Finally, one-way valve 16 is connected in parallel with the opened-type electromagnetic valve 14. The one-way valve 16 allows brake fluid to circulate towards the second output port 6.

In the driving-wheel control valve means $8_{FR}$ corresponding to the right front wheel brake $B_{FR}$, an opened-type electromagnetic valve 14 is positioned between the second hydraulic passage $10_2$ and the right front wheel brake $B_{FR}$. A closed-type electromagnetic valve 15 is provided between the second reservoir $13_2$ for common use with the driven-wheel control valve means $8_{RL}$ and the right front wheel brake $B_{FR}$. Finally, one-way valve 16 is connected in parallel with the opened-type electromagnetic valve 14. The one-way valve 16 allows brake fluid to circulate towards the second hydraulic passage $10_2$.

First reservoir $13_1$ is connected to the inlet port of a first pump $19_1$ via a first inlet passage $17_1$ and first suction valve $18_1$. Second reservoir $13_2$ is connected to the inlet port of a second pump $19_2$ via a second inlet passage $17_2$ and second suction valve $18_2$. Both the pumps $19_1$ and $19_2$ are driven by common motor 23. The discharge port of first pump $19_1$ is connected to the first hydraulic passage $10_1$ via a first discharge valve $20_1$, a first damper $21_1$ and first throttle $22_1$. The discharge port of second pump $19_2$ is connected to second hydraulic passage $10_2$ via second discharge valve $20_2$, second damper $21_2$, and second throttle $22_2$.

First switching valve means $11_1$ includes an opened-type electromagnetic valve $24_1$ provided between first output port 5 of the master cylinder M and first hydraulic passage $10_1$, and a closed-type electromagnetic valve $25_1$ provided between first output port 5 and open passage $12_1$. In the first switching valve means $11_1$, a first relief valve $26_1$, which allows brake fluid to circulate from the first hydraulic passage $10_1$ toward the first output port 5, is connected in parallel with opened-type electromagnetic valve $24_1$. A first bypass valve $27_1$, which allows brake fluid to circulate from the first output port 5 toward the first hydraulic passage $10_1$, is connected in parallel with opened-type electromagnetic valve $24_1$.

The second switching valve means $11_2$ includes an opened-type electromagnetic valve $24_2$ positioned between the second output port 6 of the master cylinder M and the second hydraulic passage $10_2$, and a closed-type electromagnetic valve $25_2$ positioned between the second output port 6 and the open passage $12_2$. In the second switching valve means $11_2$, a second relief valve $26_2$, which allows brake fluid to circulate from the second hydraulic passage $10_2$ toward the second output port 6, is connected in parallel with opened-type electromagnetic valve $24_2$. A second bypass valve $27_2$, which allows brake fluid to circulate from the second output port 6 toward the second hydraulic passage $10_2$, is connected in parallel with opened-type electromagnetic valve $24_2$.

First relief valve $26_1$ and second relief valve $26_2$ are used to prevent the hydraulic pressure in hydraulic passages $10_1$ and $10_2$ from becoming higher than the pressure that opened-type electromagnetic valve $24_1$ and opened-type electromagnetic valve $24_2$, respectively, are designed to withstand in their shut-off condition. The pressure for opening both the relief valves $26_1$ and $26_2$ is set at a relatively large value (e.g., 70 kg/cm$^2$). Moreover, traction control is exerted when brake pedal P is stepped on and opened-type electromagnetic valves $24_2$ and $24_2$ are in the shut-off condition. First and second bypass valves $27_1$ and $27_2$ open in response to a hydraulic pressure that is 1 kg/cm$^2$ higher than the hydraulic pressure in the hydraulic passages $10_1$ and $10_2$, as pumps $19_1$ and $19_2$ operate. Consequently, the output hydraulic pressure of master cylinder M acts on the left and right front wheel brakes $B_{FL}$ and $B_{FR}$.

First and second open passages $12_1$ and $12_2$ are connected to respective first and second inlet passages $17_1$ and $17_2$ between first check valve $28_1$ and second check valve $28_2$ and their respective reservoirs $13_1$ and $13_2$. First check valve $28_1$ and second check valve $28_2$ prevent brake fluid from flowing towards the respective reservoirs $13_1$ and $13_2$, and are positioned between the joint that open passages $12_1$ and $12_2$ form with first $17_1$ and second $17_2$ inlet passages, and first $13_1$ and second $13_2$ reservoirs, respectively.

The preferred operation of this embodiment of the invention will now be described. Opened-type electromagnetic valves 14 and the closed-type electromagnetic valves 15 of the respective control valve means $8_{FL}$, $8_{FR}$, $8_{RL}$ and $8_{RR}$ remain demagnetized during normal braking operation. Opened-type electromagnetic valves $24_1$ and $24_2$ and closed-type electromagnetic valves $25_1$ and $25_2$ of switching valve means $11_1$ and $11_2$ also remain demagnetized. Accordingly, the braking hydraulic pressure from the first output port 5 of master cylinder M when brake pedal $8_{RR}$ is stepped on acts on not only the left front wheel brake $B_{FL}$ but also the right rear wheel brake $B_{RR}$ via proportional pressure reducing valve $9_{RR}$. The braking hydraulic pressure from first output port 6 of master cylinder M acts on not only the right front wheel brake $B_{FR}$ but also the left rear wheel brake $B_{RL}$ via proportional pressure reducing valve $9_{RL}$.

When any one of the left/right front and left/right rear wheels is about to become locked during braking, the de-energization and excitation of opened-type electromagnetic valve 14 and closed-type electromagnetic valve 15 are controlled by the control valve means (i.e., $8_{FL}$, $8_{FR}$, $8_{RL}$ or $8_{RR}$) corresponding to the wheel ($B_{FL}$, $B_{FR}$, $B_{RL}$, $B_{RR}$, respectively) which is about to become locked. Accordingly, the wheel does not lock as the reduction, holding and intensification of the braking hydraulic pressure are controlled.

When one or both of the left or right front wheels as driving-wheels undergoes over-slipping resulting from, for example, quick starting while no braking operation is performed, opened-type electromagnetic valves $24_1$ and $24_2$ and closed-type electromagnetic valves $25_1$ and $25_2$ of both switching valve means $11_1$ and $11_2$ are excited. Consequently, hydraulic passages $10_1$ and $10_2$ are shut-off from the master cylinder M, inlet ports of pumps $19_1$ and $19_2$ are connected to master cylinder M, and motor 23 operates to start the discharge operation of the pumps $19_1$ and $19_2$. Furthermore, opened type electromagnetic valve 14 and closed-type electromagnetic valve 15 on the side corresponding to the front wheel which is about to undergo the over-slipping, are de-energized and excited to control the intensification, holding and reduction of the braking hydraulic pressure. Opened-type electromagnetic valve 14 corresponding to the front wheel which is unlikely to undergo over-slipping is energized and shut. Consequently, the front wheel which would have otherwise slipped when no braking operation performed is braked and thus prevented from slipping.

When the braking operation is performed by stepping on brake pedal P while the traction control is exerted, brake fluid from master cylinder M and from reservoirs $13_1$ and $13_2$ is sucked into pumps $19_1$ and $19_2$, which perform the discharge operation. However, check valves $28_1$ and $28_2$ cause the hydraulic pressure of master cylinder M to divert to reservoirs $13_1$ and $13_2$, thus preventing the brakes from locking. At this time, the braking hydraulic pressure from master cylinder M acts on the left and right rear wheel brakes $B_{RL}$ and $B_{RR}$ as the driven-wheel brakes via the proportional pressure reducing valves $9_{RL}$ and $9_{RR}$. When the braking hydraulic pressure from the master cylinder M is high, the operation of bypass valves $27_1$ and $27_2$ causes the braking hydraulic pressure resulting from the braking operation to act on the left and right front wheel brakes $B_{FL}$ and $B_{FR}$, respectively.

Since the second switching valve means $11_1$ and $11_2$ includes the opened-type electromagnetic valves $24_1$ and $24_2$ positioned between output ports 5 and 6 of master cylinder M and the hydraulic passages $10_1$ and $10_2$, and the closed-type electromagnetic valves $25_1$ and $25_2$ positioned between the output ports 5 and 6 and the open passages $12_1$ and $12_2$, respectively, it is also possible to improve operation of the vacuum-drawing prior to filling the brake fluid and to simplify the air-removing equipment.

As shown in FIG. 2, filling machine 30 is connected to a reservoir R attached to master cylinder M when master cylinder M is filled with brake fluid. Prior to filling master cylinder M with brake fluid, a vacuum is drawn toward master cylinder M.

Closed-type electromagnetic valves $25_1$ and $25_2$ in the respective switching valve means $11_1$ and $11_2$ are excited and opened when the vacuum-drawing work is done. When the closed-type electromagnetic valves $25_1$ and $25_2$ are opened, the left and right front wheel brakes $B_{FL}$ and $B_{FR}$ as the driving-wheel brakes, and master cylinder M are connected. The discharge ports of the pumps $19_1$ and $19_2$ and master cylinder M are also connected, as are inlet ports of the pumps $19_1$ and $19_2$, reservoirs $13_1$ and $13_2$ and master cylinder M. Therefore, the air-removing or vacuum-drawing in the direction of the master cylinder M can be done simultaneously in the hydraulic pressure system for left and right front wheel brakes $B_{FL}$ and $B_{FR}$, respectively. It is thus easier to remove air from the braking system since it is unnecessary to utilize switching valve means $11_1$ and $11_2$ when air is being removed. Therefore, equipment utilized to remove the air can also be simplified.

Since the left and right rear wheel brakes $B_{RL}$ and $B_{RR}$ as the driven-wheel brakes are connected to master cylinder M via proportional pressure reducing valves $9_{RL}$ and $9_{RR}$ and opened-type electromagnetic valves 14 in the driven-wheel control valve means $8_{RL}$ and $8_{RR}$, the air-removing work in the hydraulic pressure system pertaining to the left and right rear wheel brakes $B_{RL}$ and $B_{RR}$ can simultaneously be done when the air-removing or vacuum-drawing work is done for driving-wheel brakes $B_{FL}$ and $B_{FR}$ with the effect of improving the ability to remove air from the entire system.

Control valve means $8_{FL}$ and $8_{FR}$ may also control the switching between communicating and shut-off states between hydraulic passages $10_1$ and $10_2$ and the respective left and right front wheel brakes $B_{FL}$ and $B_{FR}$, and between the left and right front wheel brakes $B_{FL}$ and $B_{FR}$ and the respective reservoirs $13_1$ and $13_2$.

Thus, when opened-type electromagnetic valve $24_1$ and $24_2$ in switching valve means $11_1$ and $11_2$, respectively, are excited and opened when the air-removing work is done prior to the filling master cylinder M with brake fluid, there is a connection between the front wheel brakes $B_{FL}$ and $B_{FR}$ and master cylinder M; between the discharge port of the pumps $19_1$ and $19_2$ and master cylinder M; and among the inlet ports of the pumps $19_1$ and $19_2$, reservoir R and master cylinder M. Therefore, air can be removed by drawing a vacuum in the hydraulic pressure system of driving-wheel brake $B_{FL}$ and $B_{FR}$, thus improving the ability to remove air from the system. Moreover, the air-removing equipment can also be simplified because it is unnecessary to switch the position of valves $24_1$ and $25_1$ of switching valve means $11_1$ when air is being removed.

Another advantage the present invention provides is that air can be removed from the hydraulic pressure system related to the driven-wheel brakes $B_{RR}$ and $B_{RL}$ simultaneously when air is removed from the hydraulic pressure system related to the driving-wheel brakes $B_{FL}$ and $B_{FR}$.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of purging air from a braking hydraulic pressure control system for a vehicle comprising the steps of:

switching between communicating and shut-off states between a master cylinder and a first hydraulic passage, and between communicating and shut-off states between the master cylinder and a first open passage, wherein a first portion of a first switching valve means is positioned between the master cylinder and the first hydraulic passage, and a second portion of the first switching valve means is positioned between the master cylinder and the first open passage;

switching between communicating and shut-off states between the master cylinder and a second hydraulic passage, and between communicating and shut-off states between the master cylinder and a second open passage, wherein a first portion of a second switching valve means is positioned between the master cylinder and the second hydraulic passage, and a second portion of the second switching valve means is positioned between the master cylinder and the second open passage;

controlling the hydraulic pressure in a first driving-wheel brake by switching between communicating and shut-off states between the first hydraulic passage and a first driving-wheel brake, and between communicating and shut-off states between the first driving-wheel brake and a first reservoir and a first pump, wherein a first portion of a first driving-wheel control valve means is positioned between the first hydraulic passage and the first driving-wheel brake, and a second portion of the first driving-wheel control valve means is positioned between the first driving-wheel brake and the first reservoir, and wherein an inlet port of the first pump is connected to the first reservoir, and an outlet port of the first pump is connected to the first hydraulic passage; and controlling the hydraulic pressure to a second driving-wheel brake by switching between communicating and shut-off states between the second hydraulic passage and a second driving-wheel brake, and between communicating and shutoff states between the second driving-wheel brake and a second reservoir and a second pump, wherein a first portion of a second driving-wheel control valve means is positioned between the second hydraulic passage and the second driving-wheel brake, and a second portion of the second driving-wheel control valve means is positioned between the second driving-wheel brake and the second reservoir, and wherein an inlet port of the second pump is connected to the second reservoir, and an outlet port of the second pump is connected to the second hydraulic passage.

2. The method of purging air from a braking hydraulic pressure control system for a vehicle according to claim 1, further comprising the step of exciting and opening the second portion of each of the first and second switching valve means when air is removed by drawing a vacuum in a direction of the master cylinder prior to filling of brake fluid.

3. The method of purging air from a braking hydraulic pressure control system for a vehicle according to claim 1, further comprising the steps of:

providing a connection between a wheel brake and the master cylinder, between the outlet port of the first and second pump and the master cylinder when the second portion of each of the first and second switching valve means are excited and opened; and providing a connection between the inlet ports of the first and second pumps, the reservoir and the master cylinder when the second portion of each of the first and second switching valve means are excited and opened.

4. The method of purging air from a braking hydraulic pressure control system for a vehicle according to claim 1, further comprising the step of providing a relief valve in parallel with the first portion of each of the first and second switching valve means, and a bypass valve in parallel with the second portion of each of the first and second switching valve means to allow fluid to flow therethrough.

5. The method of purging air from a braking hydraulic pressure control system for a vehicle according to claim 1, further comprising the step of providing a one-way valve in parallel with the first portion of each of the first and second switching valve means to allow fluid to flow therethrough.

6. The method of purging air from a braking hydraulic pressure control system for a vehicle as claimed in claim 1, further comprising the steps of:

controlling the hydraulic pressure in a first driven-wheel brake by switching between communicating and shut-off states between the master cylinder and the first driven-wheel brake, and between communicating and shut-off states between the first driven-wheel brake and the first reservoir, wherein a first portion of a first driven-wheel control valve means is positioned between the master cylinder and a first proportional pressure reducing valve positioned adjacent to the first driven-wheel brake, and a second portion is positioned between the first proportional pressure reducing valve and the first reservoir; and controlling the hydraulic pressure in a second driven-wheel brake by switching between communicating and shut-off states between the master cylinder and the second driven-wheel brake, and between communicating and shut-off states between the second driven-wheel brake and the second reservoir, wherein a first portion of a second driven-wheel control valve means s positioned between the master cylinder and a second proportional pressure reducing valve positioned adjacent to the second driven-wheel brake, and a second portion positioned between the second proportional pressure reducing valve and the second reservoir.

* * * * *